United States Patent [19]

Yamada

[11] Patent Number: 4,852,975

[45] Date of Patent: * Aug. 1, 1989

[54] IRRADIATION IMAGE ERASE UNIT FOR USE WITH STIMULABLE PHOSPHOR SHEET

[75] Inventor: Sadami Yamada, Kanagawa, Japan

[73] Assignee: Fuji Photo Film Co., Inc., Kanagawa, Japan

[ * ] Notice: The portion of the term of this patent subsequent to Oct. 25, 2005 has been disclaimed.

[21] Appl. No.: 137,706

[22] Filed: Feb. 25, 1988

Related U.S. Application Data

[63] Continuation of Ser. No. 740,458, Jun. 3, 1985.

[51] Int. Cl.$^4$ .............................................. G01N 23/04
[52] U.S. Cl. ............................... 250/327.2; 250/484.1
[58] Field of Search ........................... 250/327.2, 484.1; 378/172, 173, 174

[56] References Cited

U.S. PATENT DOCUMENTS 3,444,372  5/1969  Hart ................................... 250/327.2
4,438,333  3/1984  Teraoka et al. ................... 250/327.2

*Primary Examiner*—Janice A. Howell
*Assistant Examiner*—Richard Hanig
*Attorney, Agent, or Firm*—Sughrue, Mion, Zinn, Macpeak & Seas

[57] ABSTRACT

An irradiation image erase unit for erasing a residual image from a stimulate phosphor sheet with erasure light is disposed in the vicinity of an image read-out unit which converts light emitted from the stimulable phosphor sheet upon stimulation thereof into an electric signal. The irradiation image erase unit comprises a box-shaped casing having a slot for passage of the stimulable phosphor sheet therethrough into the casing, and erasure light sources disposed in the casing for emitting the erasure light. A pair of rollers is mounted on the casing adjacent to the slot for introducing the stimulable phosphor sheet into the casing. The rollers or a cover enclosing the rollers serves to prevent the erasure light from leaking out of the casing toward the image read-out unit.

13 Claims, 7 Drawing Sheets

IRRADIATION IMAGE ERASE UNIT FOR USE WITH STIMULABLE PHOSPHOR SHEET

This is a continuation, of application Ser. No. 740,458 filed 6/3/85.

BACKGROUND OF THE INVENTION

The present invention relates to an irradiation image information read-out system, and more particularly to an irradiation image erase unit for use with a stimulable phosphor sheet in such an irradiation image information read-out system having a read-out unit, wherein the irradiation image erase unit disposed near the read-out unit is a unitary structure, simple and small in overall construction, and arranged to prevent erasure light from leaking toward the read-out unit.

There has in recent years been proposed an irradiation image recording and reproducing system in which an irradiation image of an object can be produced by using a stimulable phosphor. The stimulable phosphor, when exposed to an irradiation such as X-rays, $\alpha$-rays, $\beta$-rays, $\gamma$-rays, cathode rays, or ultraviolet rays, stores a part of the energy of the irradiation. When the stimulable phosphor exposed to the radiation is exposed to stimulating rays such as visible light, the stimulable phosphor emits light in proportion to the stored energy of the radiation. The irradiation image recording and reproducing system employs such a stimulable phosphor. More specifically, the irradiation image of an object such as a human body is stored in a sheet having a stimulable phosphor (hereinafter referred to as a "stimulable phosphor sheet" or a "phosphor sheet"), and then the stimulable phosphor sheet is scanned with stimulating rays such as a laser beam to cause the stimulable phosphor sheet to emit light representative of the irradiation image. The emitted light is photoelectrically detected and converted to an electric image signal which is processed to reproduce a visible image on a recording medium such as a photographic light-sensitive material or on a display unit such as a cathode ray tube (CRT). The aforesaid irradiation image information recording and reproducing system is disclosed in Japanese Laid-Open Patent Publication. No. 55-12429 or 56-11395, for example.

The irradiation image recording and reproducing system of the type described above is of greater practical advantage than conventional radiographic systems using a combination of an intensifying screen and an X-ray film in that images can be recorded in a wide range of radiation exposure. More specifically, it is known that the amount of light emitted from a stimulable phosphor upon stimulation thereof is proportional in a highly wide range to the amount of irradiation to which the stimulable phosphor has been exposed. Therefore, even if the amount of radiation t which the stimulable phosphor is exposed varies widely under various conditions, irradiation images free from such exposure variations can be obtained by selecting a suitable read-out gain in the photoelectric transducer for reading and converting the emitted light into an electric signal, and processing the electric signal into a visible image on a recording medium such as photographic light-sensitive material or on a display unit such as a CRT.

The irradiation image recording and reproducing system is capable of processing a converted electric signal to produce a visible image on a recording medium or a display unit so that the irradiation image can well be observed for diagnostic purpose. In this system, the stimulable phosphor sheet does not serve as a final image recording medium, but as a temporary image storage medium for eventually transferring images to the final recording medium or display unit. Therefore, the stimulable phosphor sheet can be used repeatedly, and is economical and convenient if in repetitive use.

To reuse the stimulable phosphor sheet, the residual irradiation energy on the stimulable phosphor sheet after the irradiation image has been read out by stimulating rays is discharged by exposure to light having a wavelength within the stimulating wavelength for the stimulable phosphor constituting the stimulable phosphor sheet, and the stimulable phosphor sheet is ready again for recording an irradiation image thereon. The erasure of the irradiation energy from the stimulable phosphor sheet is disclosed in U.S. Pat. No. 4,400,619, Japanese Laid-Open Patent Publication No. 56-11392 or 56-12599, for example.

An irradiation image read-out system designed to meet the above requirement includes an image read-out unit for reading out an image which has been stored in a reusable stimulable phosphor sheet by exposing it to an irradiation passing through an object, and an image erasure unit for discharging residual irradiation energy from the stimulable phosphor sheet after the image has been read out so as to allow the stimulable phosphor sheet to be reused for recording a next irradiation image. With the image read-out unit and the image erasure unit combined into one system, the system is compact in size and can be installed in a small space, and hence it is quite practical and convenient in use.

In such an irradiation image read-out system, the image read-out unit and the image erasure unit should preferably be disposed as closely to each other as possible for making system compact. However, if the image read-out unit and the image erasure unit were positioned so closely to each other that there would be no space therebetween, then certain problems would arise. When the stored image is to be read out, the stimulable phosphor sheet is exposed to stimulating rays to cause it to emit light in the pattern of the stored image, and the interior of the image read-out unit should be kept as dark as possible. The image erasure unit houses therein a light source which is as intensive as possible for discharging all of the remaining irradiation energy stored in the stimulable phosphor sheet. If any light from the image erasure unit leaked into the image read-out unit positioned closely to the image erasure unit, then the image could not be read out accurately by the image read-out unit, and no accurate irradiation image could not be obtained.

SUMMARY OF THE INVENTION

It is an object of the present invention to provide an irradiation image erase unit for erasing a residual irradiation image from a stimulable phosphor sheet by exposing the same to erasure light in an irradiation image read-out system having an image read-out unit, the irradiation image erase unit being arranged to prevent the erasure light from leaking out toward the irradiation image read-out unit, and being compact in overall size.

It is a primary object of the present invention to provide an irradiation image erase unit for erasing a residual irradiation image from a stimulable phosphor sheet by exposing the same to erasure light in an irradiation image recording and read-out system having an image read-out unit for subjecting the stimulable phosphor sheet to stimulating rays to cause the sheet to emit light representative of the irradiation image stored therein, for detecting the light emitted from the stimulable phosphor sheet, and for converting said emitted light photoelectrically to an electric signal, the irradiation image erase unit comprising: a casing having an inlet slot for passage therethrough of the stimulable phosphor sheet fed from the image read-out unit into the casing; erasure light source means disposed in the casing for emitting the erasure light; and at least one feeder means mounted on the casing at the inlet slot for delivering the stimulable phosphor sheet into the casing.

Another object of the present invention is to provide an irradiation image erase unit wherein the feeder means comprises a pair of rollers disposed in confronting relation to the inlet slot, the rollers being held in rolling contact with each other for substantially closing the inlet slot from the image read-out unit.

Still another object of the present invention is to provide an irradiation image erase unit including a resilient member mounted on the casing for normally urging the rollers against each other.

A still further object of the present invention is to provide an irradiation image erase unit wherein the resilient member comprises a coil spring held in engagement with a rotatable shaft of one of the rollers.

A yet still further object of the present invention is to provide an irradiation image erase unit including a rotative drive source mounted on the casing and having a drive shaft, a sprocket mounted on the drive shaft, another sprocket mounted on a rotatable shaft of one of the rollers, and a chain trained around the sprockets for rotating the rollers upon operation of the rotative drive source.

Still another object of the present invention is to provide an irradiation image erase unit including a displaceable tensioning sprocket disposed between the sprocket on the drive shaft and the sprocket on the roller shaft, the chain being trained around the displaceable tensioning sprocket.

A still further object of the present invention is to provide an irradiation image erase unit including a limit switch having a detecting arm held in contact with one of the rollers, the limit switch being electrically coupled to the rotative drive source for controlling the delivery of the stimulable phosphor sheet into and out of the casing and the positioning thereof in the casing.

A still further object of the present invention is to provide an irradiation image erase unit wherein the feeder means comprises a pair of rollers and a cover mounted on the casing in enclosing relation to the rollers, the cover having a slot.

A still further object of the present invention is to provide an irradiation image erase unit wherein the slot in the cover having a length smaller than the axial length of the rollers.

A yet still further object of the present invention is to provide an irradiation image erase unit wherein each of the rollers has an axial length longer than the width of the stimulable phosphor sheet so that the axial ends of the rollers will contact each other when the stimulable phosphor sheet is pinched between the rollers.

Still another object of the present invention is to provide an irradiation image erase unit wherein each of the rollers is formed of a flexibly resilient material.

A still further object of the present invention is to provide an irradiation image erase unit wherein each of the rollers includes a fibrous layer disposed at least partly around the circumferential surface thereof and having relatively long projecting thread ends.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
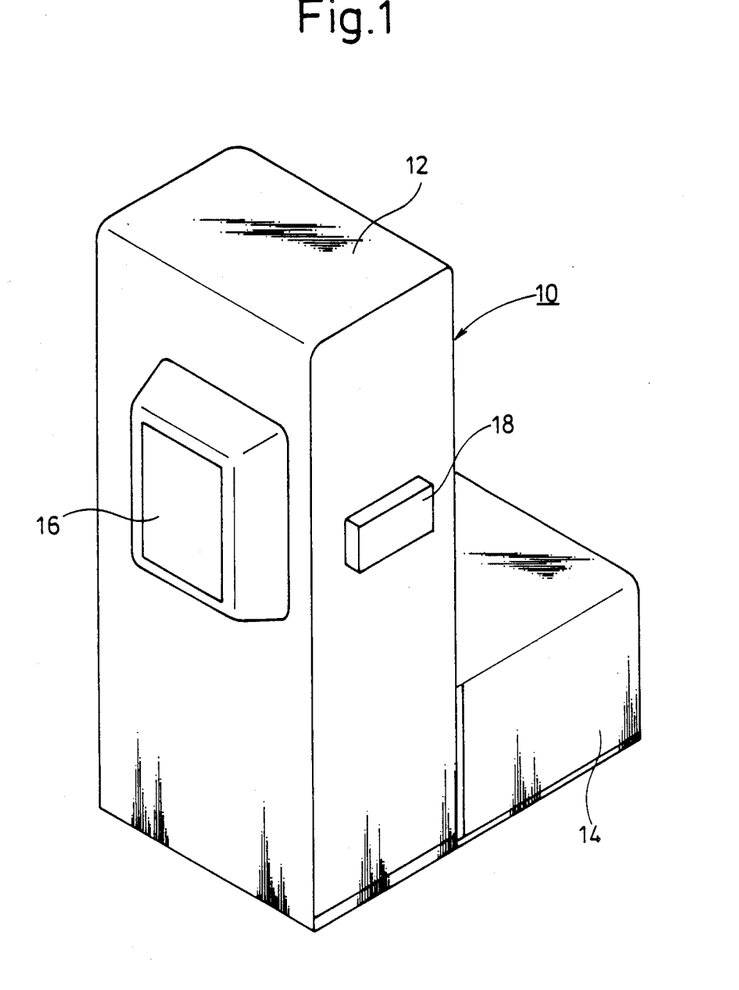
FIG. 1 is a perspective view of an irradiation image recording and read-out system.

The reference numeral 10 in FIG. 1 denotes an upstanding irradiation image recording and read-out system including a first vertical housing 12 and a second horizontal housing 14. The first housing 12 supports an exposure unit or image recording unit 16 on a front upper portion thereof and a control unit 18 on a side upper wall thereof.

Figure 2:
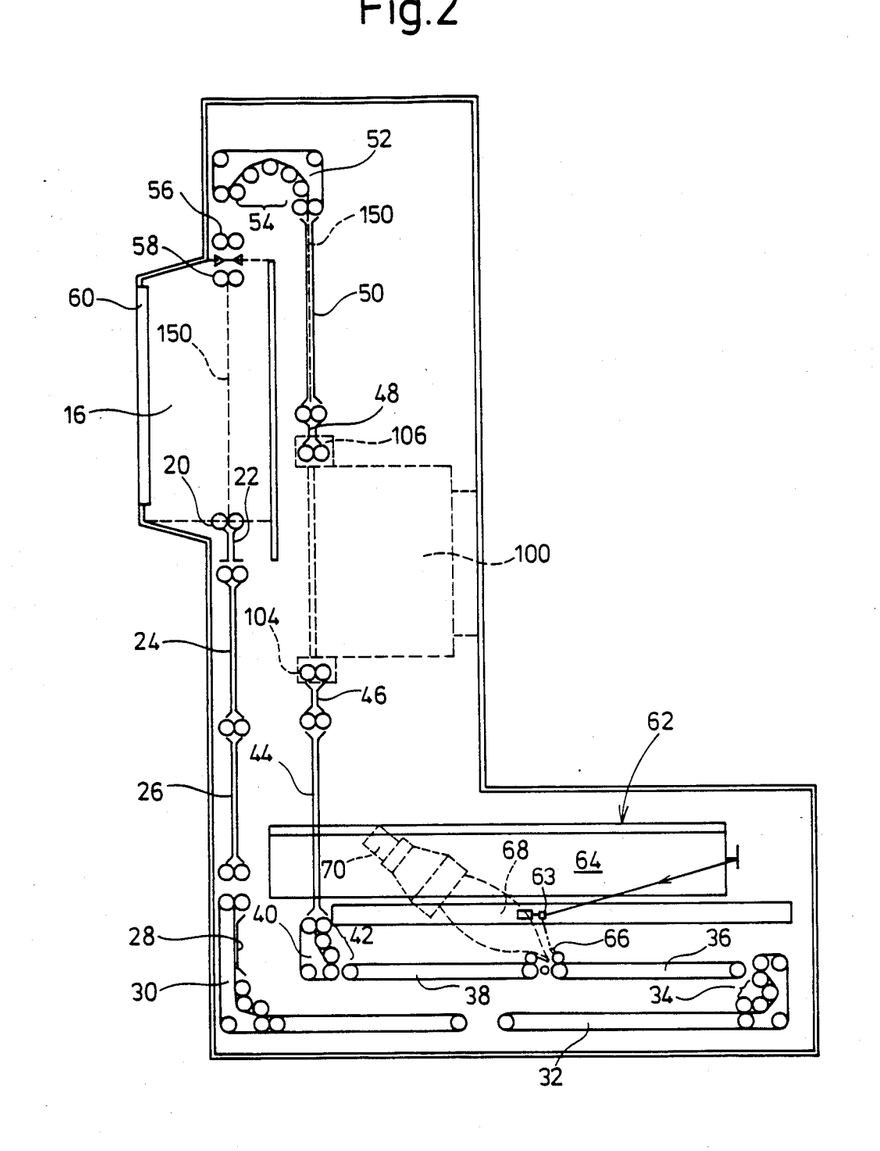
FIG. 2 is a vertical cross-sectional view of the irradiation image recording and read-out system shown in FIG. 1.

The arrangements in the first and second housings 12, 14 will be described with reference to FIG. 2. A pair of sheet reception rollers 20 for receiving a stimulable phosphor sheet on which an image is recorded is disposed in a lower portion of the image recording unit 16. Below the roller pair 20, there are disposed a first pair of confronting guide members 22 and a second pair of confronting guide members 24, each pair extending in the vertical direction. There is a roller pair disposed between the first and second pairs of guide members 22, 24, respectively. A pair of third pair of confronting guide members 26 is located beneath the first and second pairs of guide members 22, 24 with another roller pair disposed therebetween. Roller pairs are rotatably disposed between the third pair of guide members 26 and a fourth guide member 28 disposed therebelow.

A first endless feed belt 30 is disposed partly against the fourth guide member 28 and has an angularly bent configuration at an inner corner of the first housing 12. The first feed belt 30 terminates at a lower central portion of the second housing 14. A second endless feed belt 32 is disposed in a slightly spaced relation to the terminal end of the first endless feed belt 30. The second endless feed belt 32 is angularly bent in an upward direction at an inner corner of the second housing 14. A group of four rollers 34 is held against the inner bent portion of the second feed belt 32. Third and fourth successively positioned endless feed belts 36, 38, respectively, extend horizontally with the third belt 36 in slightly spaced relation to the terminal end of the feed belt 32. A fifth endless belt 40 bent upwardly is located in the vicinity of the terminal end of the fourth feed belt 38. A group of three rollers 42 is held against a surface of the belt 40.

The fifth belt 40 and the roller group 42 are located beneath a pair of confronting guide members 44 disposed below a pair of confronting guide members 46 with a pair of confronting rollers interposed therebetween. Above the guide members 46, there is positioned an irradiation image erase unit 100 of the present invention which will be described in detail later on. Relatively short guide members 48 are disposed above the irradiation image erase unit 100, and other guide members 50 are located above the guide members 48. An endless feed belt 52 of a bent configuration is disposed in the vicinity of the terminal ends of the guide members 50 in a substantially top portion of the first housing 12. A roller group 54 is held against a curved inner run of the feed belt 52. Below the feed belt 52 and the roller group 54, there are disposed two pairs of rollers 56, 58 for supplying a stimulable phosphor sheet into the image recording unit 16.

The feed system for a stimulable phosphor sheet has the above basic construction in the irradiation image recording and read-out system 10.

The image read-out unit, designated at 62, positioned in relation to the feed system will be described.

The image read-out unit 62 is basically composed of a laser beam source 64, a scanning optical system 63 including a galvanometer mirror for scanning a laser beam emitted from the laser beam source 64 over a stimulable phosphor sheet, a reflecting mirror 66 for collecting light, and a light collecting optical element 68 for effectively collecting part of light emitted from the stimulable phosphor sheet by the scanning laser beam, and also light reflected by the reflecting mirror 66. A photomultiplier (photoelectric conversion device) 70 is mounted on the top of the light collecting optical element 68.

Figure 3:
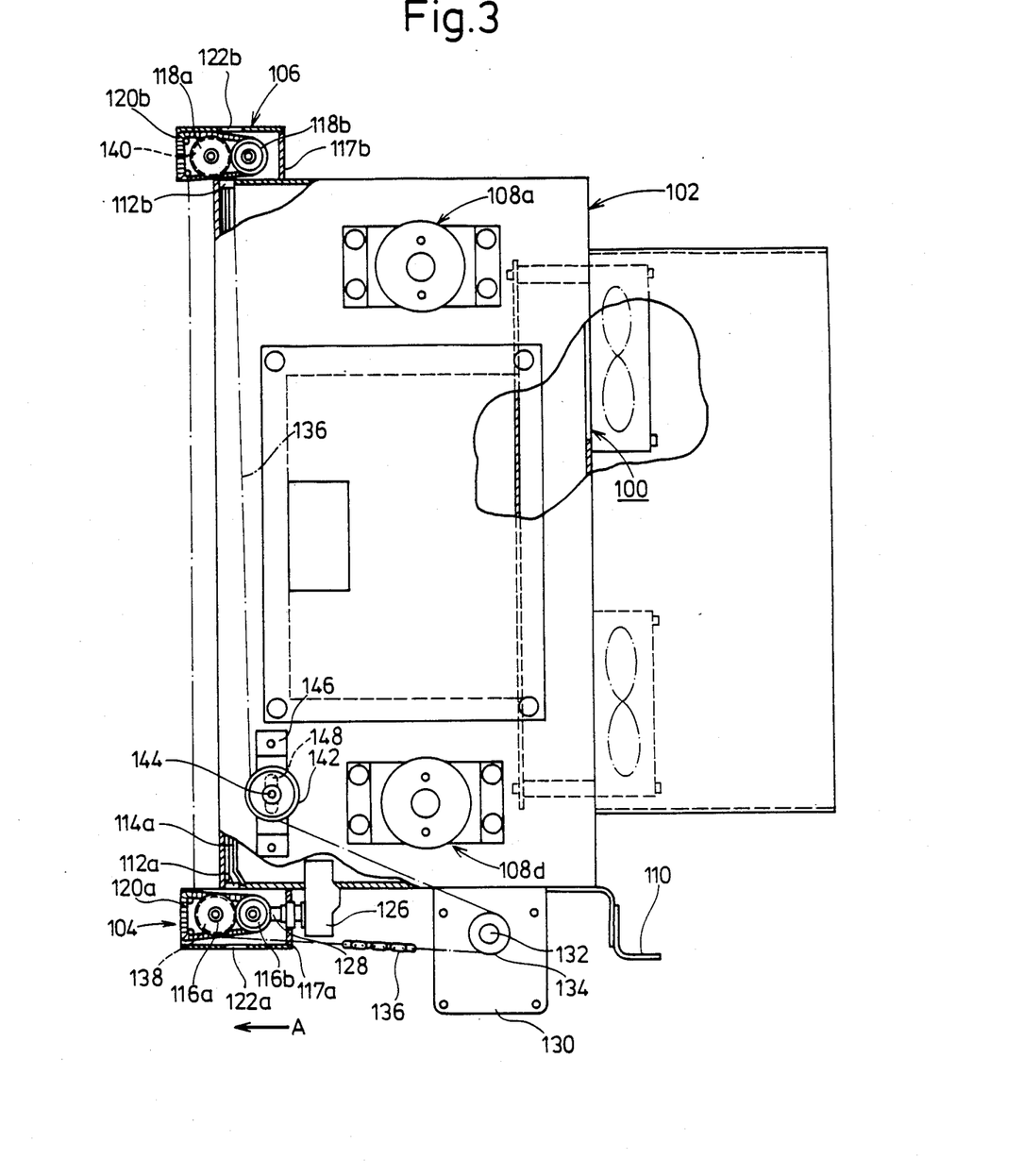
FIG. 3 is an enlarged vertical cross-sectional view of an irradiation image erase unit for a stimulable phosphor sheet according to the present invention.

The irradiation image erase unit 100 according to the present invention is shown in detail in FIG. 3. The irradiation image erase unit 100 essentially comprises a casing 102, a pair of feeders 104, 106 mounted on the lower and upper ends, respectively, of the casing 102, and first through fourth light sources 108a through 108d (FIG. 4) for emitting erasure light into the casing 102. An angle member 110 is fixed to the lower end of the casing 102. The casing 102 can be fixed to the first housing 12 by attaching the angle member 110 to the first housing 12.

Figure 4:
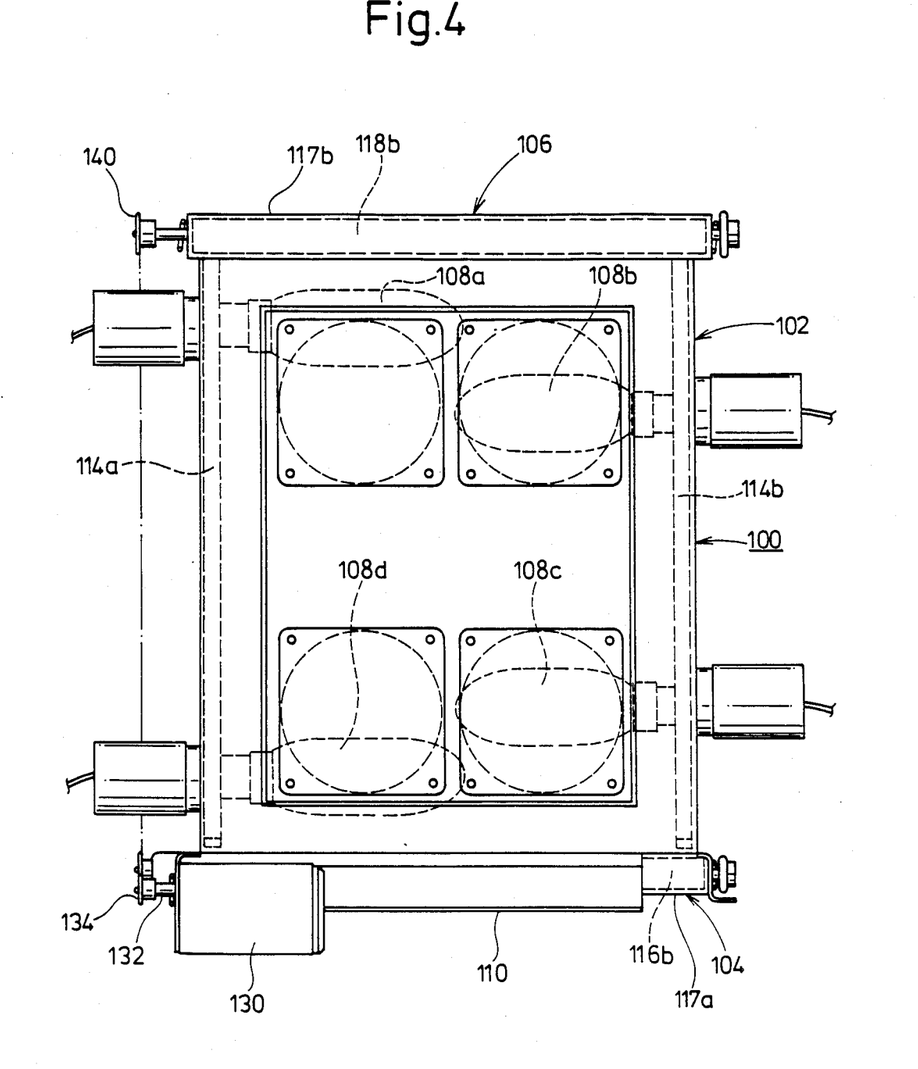
FIG. 4 is a side elevational view of the irradiation image erase unit shown in FIG. 3.

The casing 102 has inlet and outlet slots 112a, 112b defined in upper and lower panels thereof adjacent to the feeders 104, 106, respectively. Guide members 114a, 114b are disposed in parallel spaced relation in the casing 102 and extend from the inlet slot 112a to the outlet slot 112b as shown in FIG. 4. The feeder 104 is composed of a pair of nip rollers 116a, 116b held in rolling contact with each other and enclosed in a first cover 117a attached to the lower panel of the casing 102. Likewise, the feeder 106 is composed of a pair of nip rollers 118a, 118b held in rolling contact with each other and enclosed in a second cover 117b attached to the upper panel of the casing 102. Resilient members 120a, 120b such as coil springs are engaged by pins attached to the covers 117a, 117b, respectively, and held in engagement with the rotatable shafts of the nip rollers 116b, 118b for normally urging them to be forcibly pressed against the nip rollers 116a, 118a, respectively.

Figures 7, 8:
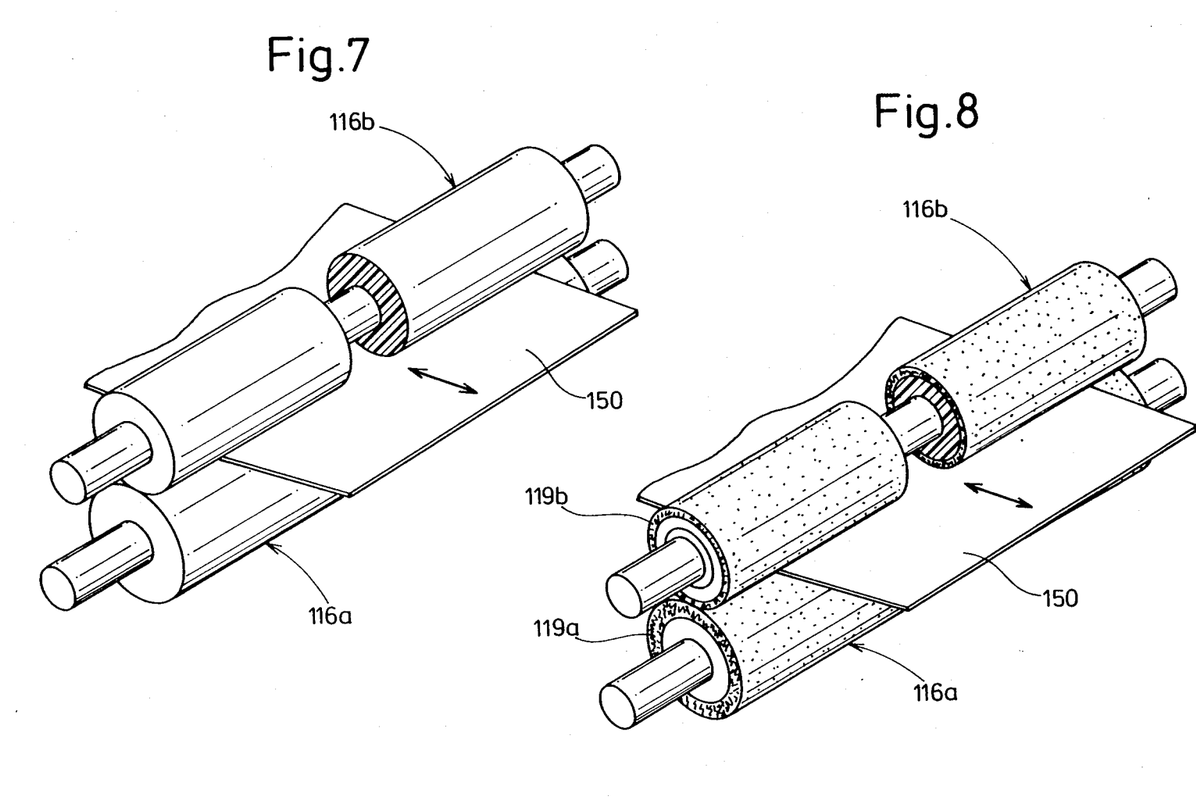
FIG. 7 is a perspective view, partly cut away, of nip rollers each made of a resilient material such as rubber which can be incorporated in the irradiation image erase unit.
FIG. 8 is a perspective view, partly cut away, of nip rollers each made of a resilient material such as rubber and a fabric with relatively long thread ends projecting on its surface, the nip rollers being adapted to be incorporated in the irradiation image erase unit.

Each of the nip rollers 116a, 116b (118a, 118b) is made of a flexibly resilient material such as rubber as shown in FIG. 7, or is made of such a flexibly resilient material covered on its surface with fabrics 119a or 119b having relatively long thread ends projecting from its surface as shown in FIG. 8.

Figure 5:
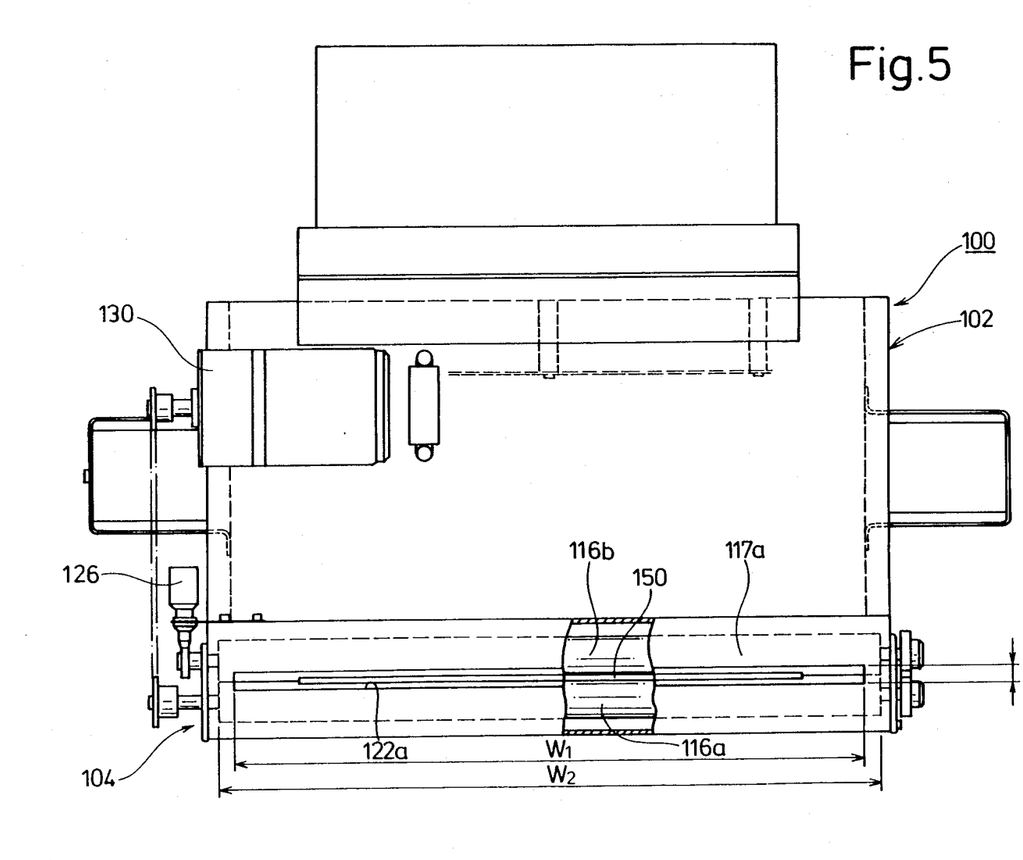
FIG. 5 is a bottom view of the irradiation image erase unit shown in FIG. 3.
Figure 6:
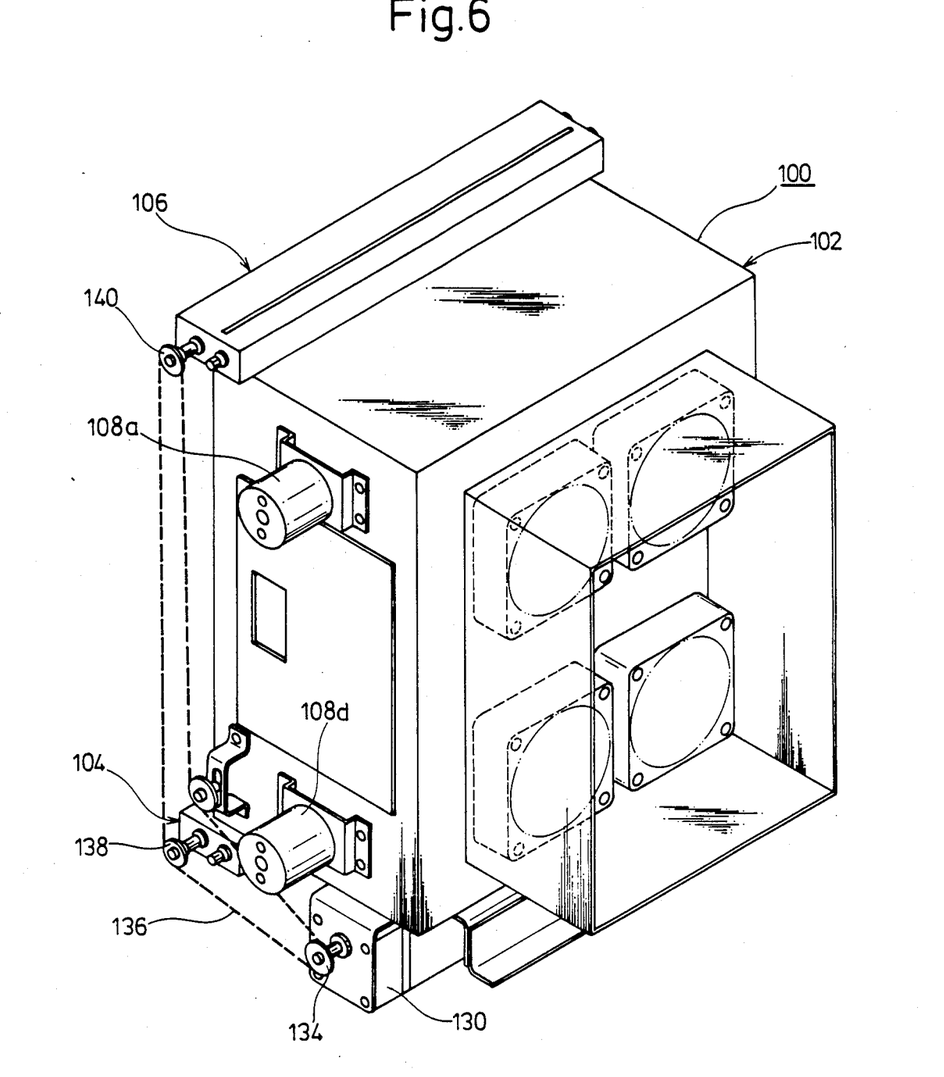
FIG. 6 is a perspective view of the irradiation image erase unit shown in FIG. 3.

Referring back to FIG. 3, the covers 117a, 117b have slots 122a, 122b, respectively, aligned with the inlet and outlet slots 112a, 112b, respectively. As shown in FIG. 5, at least the slot 122a aligned with the inlet slot 112a has a width $W_1$ smaller than the width $W_2$ of the nip rollers 116a, 116b. The width $W_1$ of the slot 122a is selected to be slightly larger than the width of the stimulable phosphor sheet which passes through the slot 122a. The axial length of the nip rollers 116a, 116b is larger than the width of the stimulable phosphor sheet so that the axial ends of the nip rollers 116a, 116b are held against each other when the stimulable phosphor sheet is pinched therebetween. The slot 122a has a height h of a minimum dimension for allowing the stimulable phosphor sheet to be inserted therethrough.

As shown in FIG. 3, a microswitch 126 mounted on the casing 102 as a limit switch has a detecting arm 128 held in sliding contact with the nip roller 116b. A motor 130 is fixed to the casing 102 closely to the angle member 110 and has a rotatable shaft 132 to which a first sprocket 134 is fixed. A chain 136 is trained around the first sprocket 134, a second sprocket 138 fixed coaxially to the nip roller 116a, and a third sprocket 140 fixed coaxially to the nip roller 118a. The chain 136 is also trained around a fourth tensioning sprocket 142 rotatably mounted on the side panel 102a of the casing 102. The fourth sprocket 142 is supported on a shaft 144 displaceable in a slot 148 defined in a holder 146 attached to the side panel 102a for giving the chain 136 an optimum tension.

Operation of the irradiation image erase unit thus constructed will be described below.

An object (not shown) held against an exposure surface 60 of the image recording unit 16 is exposed to an irradiation, and an irradiation image of the object is recorded on a stimulable phosphor sheet 150. The stimulable phosphor sheet 150 is then fed through the rollers 20, the guide members 22, 24, 26, 28, and the endless belts 30, 32, 36 to the image read-out unit 62. In the image read-out unit 62, the stimulable phosphor sheet 150 is scanned through the scanning optical system 63 by a laser beam emitted from the laser source 64 to emit light which is reflected directly or by the mirror 66 to the optical device 68. The light from the optical device 68 is then converted by the photomultiplier 70 to an electric signal that is fed to an image reproducing unit (not shown).

After the irradiation image has been read from the stimulable phosphor sheet 150, the stimulable phosphor sheet 150 is fed by the feed belts 38, 40 through the guide members 44 and the guide members 46 to the nip rollers 116a, 116b. The stimulable phosphor sheet 150 is introduced into the inlet slot 122a and is led by the nip rollers 116a, 116b to the guide members 114a, 114b. When the stimulable phosphor sheet 150 is pinched between the nip rollers 116a, 116b, the nip roller 116b is displaced by the sheet 150 away from the nip roller 116a against the tension of the coil spring 120a. Since the axial length of the nip rollers 116a, 116b is selected to be sufficiently longer than the sheet 150, the axial ends of the nip rollers 116a, 116b are held in contact with each other even with the sheet 150 pinched between the nip rollers 116a, 116b.

When the nip roller 116b is displaced, it pushes the detecting arm 128 of the microswitch 126. The microswitch 126 then generates a signal to energize the motor 130, whereupon the chain 136 is moved to rotate the second sprocket 138. Since the second sprocket 138 is fixed coaxially to the nip roller 116a, the nip roller 116a is rotated t deliver the stimulable phosphor sheet 150 toward the guide members 114a, 114b while the nip roller 116b is also being rotated.

As described above, the microswitch 126 is turned on to energize the motor 130 when the stimulable phosphor sheet 150 reaches the nip roller 116b and displaces the same. Upon rotation of the motor 130, the third spocket 140 also rotates the nip rollers 118a, 118b. As the leading end of the stimulable phosphor sheet 150 moves through the guide members 114a, 114b and reaches the nip rollers 118a, 118b, the trailing end of the stimulable phosphor sheet 150 leaves the nip rollers 116a, 116b. The nip roller 116b is now displaced in the direction of the arrow A (FIG. 3) toward the nip roller 116a under the resiliency of the coil spring 120a. As a result, the detecting arm 128 of the microswitch 126 is also displaced in the direction of the arrow A, and the microswitch 126 issues a signal to reverse the motor 130. The stimulable phosphor sheet 150 with its leading end gripped by the nip rollers 118a, 118b is then moved back toward the nip rollers 116a, 116b. When the trailing end of the sheet 150 is gripped again between the nip rollers 116a, 116b, the nip roller 116b and hence the detecting arm 128 are displaced again to enable the microswitch 126 to issue a signal for de-energizing the motor 130. Now, the stimulable phosphor sheet 150 is held between the nip rollers 116a, 116b and the nip rollers 118a, 118b.

The light sources 108a, 108b, 108c, and 108d are energized to emit light which is reflected sufficiently back and forth in the casing 102 to erase any residual irradiation image from the stimulable phosphor sheet 150. The erasure light emitted from the light sources 108a through 108d has a wavelength in the range of stimulating wavelengths of the stimulable phosphor sheet 150.

As described above, the axial length or width $W_2$ of the nip rollers 116a, 116b is selected to be larger than the width of the sheet 150 and also larger than the width $W_1$ of the slot 122a. Therefore, the erasure light which illuminates the sheet 150 pinched between the nip rollers 116a, 116b is effectively prevented from leaking out of the erase unit 100 particularly toward the image read-out unit 62. Where the nip rollers 116a, 116b and 118a, 118b are formed of the flexibly resilient material such as rubber or provided with the fabrics having relatively long projecting thread ends, as shown in FIGS. 7 and 8, any gap between the nip rollers is so small even when the sheet 150 is pinched therebetween that no erasure light will leak out toward the image read-out unit 62.

A prescribed period of time after the light sources 108a through 108d have been energized, the motor 130 is energized again to move the chain 136 to cause the nip rollers 118a, 118b to feed the stimulable phosphor sheet 150 toward the guide members 48. Since the residual image is completely erased from the stimulable phosphor sheet 150 upon arrival at the guide members 48, a next irradiation image can well be recorded on and stored in the stimulable phosphor sheet 150 which has been delivered into the image recording unit 16 through the endless belt 52 and the rollers 52, 58.

With the arrangement of the present invention, as described above, an irradiation image erase unit for use with a stimulable phosphor sheet is composed of a casing, two pairs of nip rollers disposed at slots in the casing for pinching the stimulable phosphor sheet and feeding the same through the slots, and erasure light sources disposed in the casing for emitting light. The light emitted from the erasure light sources falls, directly or through reflection, on the stimulable phosphor sheet to effectively erase any remaining irradiation image from the stimulable phosphor sheet so that a next irradiation image can well be recorded and stored in the stimulable phosphor sheet. Since the erase unit is completely shielded against light leakage toward the image read-out unit, there is no danger of noise which would otherwise be produced by the leakage of erasure light from the erasure unit into the image read-out unit during operation thereof. The erase unit as assembled in the casing can easily be incorporated in the irradiation image recording and read-out system, which itself may be compact in size as the erase unit takes up only a small installation space in the system.

The present invention may be incorporated in a bed-type irradiation image recording and read-out system, an irradiation image read-out system having an image read-out unit and an image erase unit and separated from an image recording unit, or an irradiation image erase unit independent of an image read-out unit and an image recording unit for the sole purpose of erasing residual irradiation images.

Although certain preferred embodiments have been shown and described, it should be understood that many changes and modifications may be made therein without departing from the scope of the appended claims.

What is claimed is:

1. A radiation image recording and read-out system including a radiation image erase unit (100) for erasing a residual radiation image from a stimulable phosphor sheet (150) by exposing the sheet to erasure light and an image read-out unit (62) for irradiating the stimulable phosphor sheet with stimulating rays to cause the sheet to emit light representative of the radiation image stored therein, for detecting the light emitted from the stimulable phosphror sheet, and for converting said emitted light photoelectirically into an electric signal, wherein the radiation image erase unit further comprises: a casing (102) having an inlet slot (112a) for passage therethrough of said stimulable phosphor sheet fed from said image read-out unit into said casing; erasure light source means (108) disposed in said casing for emitting the erasure light; and at least one feeder means (104) mounted on said casing at said inlet slot for delivering said stimulable phosphor sheet into said casing and including shielding means for blocking an escaping portion of the erasure light which passes through said inlet slot from passing to said image read-out unit wherein said shielding means includes a pair of rollers and a cover for enclosing said rollers.

2. A radiation image erase unit according to claim 1, wherein said rollers (116a, 116b) are disposed proximate to and in confronting relation to said inlet slot, said rollers being held in rolling contact with each other for substantially closing said inlet slot from said image read-out unit.

3. A radiation image erase unit according to claim 2, including a resilient member (120a) mounted on said casing for normally urging said rollers against each other.

4. A radiation image erase unit according to claim 3, wherein said resilient member comprises a coil spring held in engagement with a rotatable shaft of one of said rollers.

5. A radiation image erase unit according to claim 2, including a rotative drive source (130) mounted on said casing and having a drive shaft (132), a sprocket (134) mounted on said drive shaft, another sprocket (138) mounted on a rotatable shaft of one of said rollers, and a chain (136) trained around said sprockets for rotating the rollers upon operation of said rotative drive source.

6. A radiation image erase unit according to claim 5, including a displaceable tensioning sprocket (142) disposed between said sprocket on said drive shaft and said sprocket on said roller shaft, said chain being trained around said displaceable tensioning sprocket.

7. A radiation image erase unit according to claim 5, including a limit switch (126) having a detecting arm (128) held in contact with one of said rollers, said limit switch being electrically coupled to said rotative drive source for controlling the delivery of said stimulable phosphor sheet into and out of said casing and the positioning thereof in said casing.

8. A radiation image erase unit according to claim 1, wherein said cover (117a) is mounted on said casing, said cover having a slot (122a) for passage therethrough of said stimulable phosphor sheet, fed from said image read-out unit, between said rollers.

9. A radiation image erase unit according to claim 8, wherein each of said rollers has an axial length longer than the width of said stimulable phosphor sheet so that the axial ends of said rollers will contact each other when said stimulable phosphor sheet is pinched between said rollers.

10. A radiation image erase unit according to claim 2, wherein each of said rollers is formed of a flexibly resilient material.

11. A radiation image erase unit according to claim 2, wherein each of said rollers includes a fibrous layer (119) disposed at least partly around the circumferential surface thereof and having relatively long projecting thread ends.

12. A radiation image erase unit according to claim 9, wherein a trailing end of said sheet is disposed between said rollers when said sheet is irradiated in said erase unit.

13. A radiation image recording and read-out system including a radiation image erase unit (100) for erasing a residual radiation image from a stimulable phosphor sheet (150) by exposing the sheet to erasure light and an image read-out unit (62) for irradiating the stimulable phosphor sheet with stimulating rays to cause the sheet to emit light representative of the radiation image stored therein, for detecting the light emitted from the stimulable phosphor sheet, and for converting said emitted light photoelectrically into an electric signal, wherein the radiation image erase unit further comprises: a casing (102) having an inlet slot (112a) for passage therethrough of said stimulable phosphor sheet fed from said image read-out unit into said casing; erasure light source means (108) disposed in said casing for emitting the erasure light; and at least one feeder means (104) mounted on said casing at said inlet slot for delivering said stimulable phosphor sheet into said casing and including shielding means for blocking an escaping portion of the erasure light which passes through said inlet slot from passing to said image read-out unit, wherein said shielding means includes a pair of rollers and a cover for enclosing said rollers, and wherein said image erase unit is provided proximate to said image read-out unit, said image read-out unit being located in a path of the escaping portion of the erasure light but for the shielding means.

* * * * *

UNITED STATES PATENT AND TRADEMARK OFFICE
CERTIFICATE OF CORRECTION

PATENT NO. : 4,852,975

DATED : August 1, 1989

INVENTOR(S) : Sadami YAMADA

It is certified that error appears in the above-identified patent and that said Letters Patent is hereby corrected as shown below: On the title page:

Change Assignee's name from "Fuji Photo Film Co., Inc." to --Fuji Photo Film Co., Ltd.--

The claimed priorities are omitted. They are:

Japanese Patent Applications No. 59-112530 and
No. 59-112531 (both filed June 1, 1984)

Signed and Sealed this

Twenty-sixth Day of February, 1991

*Attest:*

HARRY F. MANBECK, JR.

*Attesting Officer*  *Commissioner of Patents and Trademarks*